J. R. JOHNSON.
DRIVING MECHANISM FOR MOTOR VEHICLES.
APPLICATION FILED JAN. 21, 1918.
1,294,470.
Patented Feb. 18, 1919.
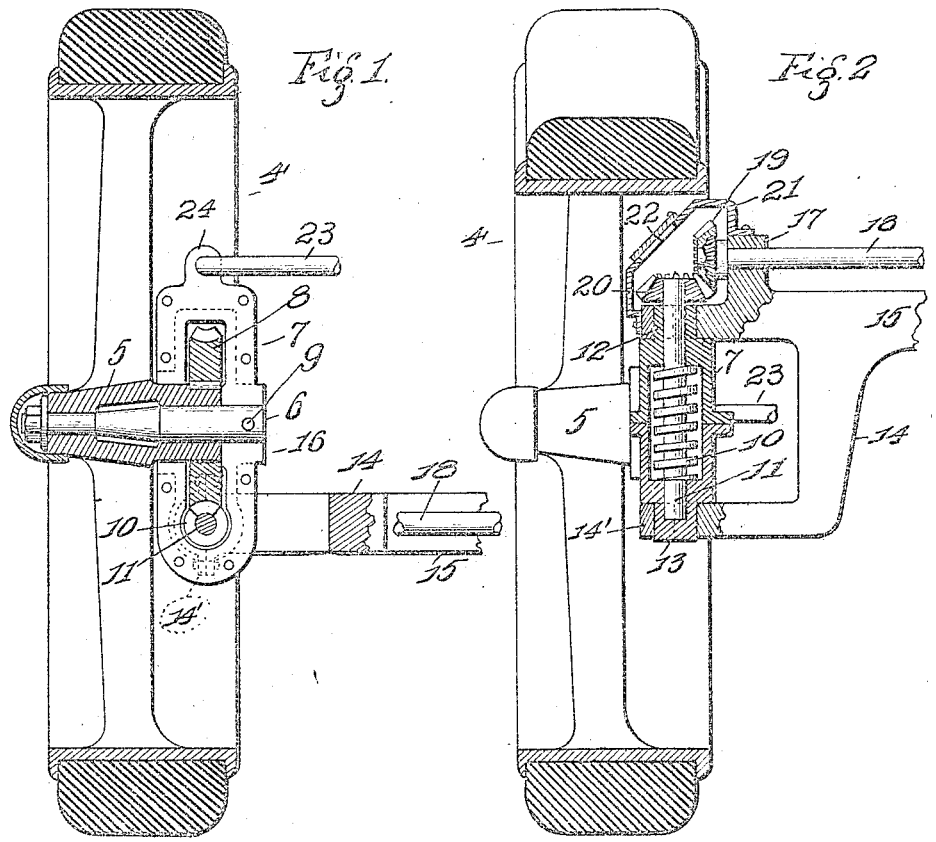
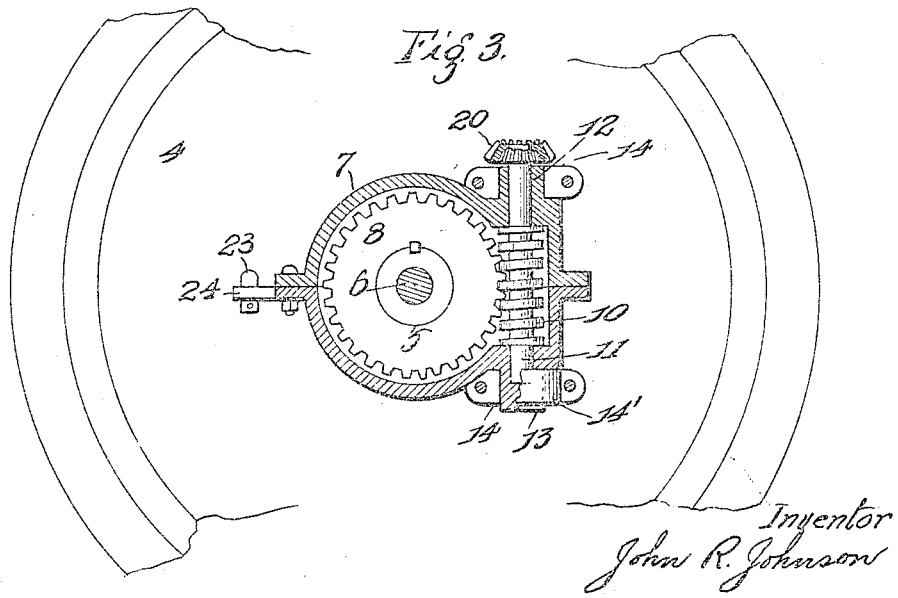
Inventor
John R. Johnson

UNITED STATES PATENT OFFICE.

JOHN R. JOHNSON, OF FOREST CITY, IOWA.

DRIVING MECHANISM FOR MOTOR-VEHICLES.

1,294,470.  Specification of Letters Patent.  Patented Feb. 18, 1919.

Application filed January 21, 1918. Serial No. 213,024.

*To all whom it may concern:*

Be it known that I, JOHN R. JOHNSON, a subject to the King of Sweden, and resident of Forest City, Iowa, have invented certain new and useful Improvements in Driving Mechanism for Motor-Vehicles, of which the following is a specification.

This invention relates to improvements in a driving mechanism for motor vehicles, and has for its object a worm drive mechanism which is preferably located on the front of a motor vehicle and is so arranged as to enable the wheels to be driven and steered at the same time.

A further object of my invention is to provide the front wheels of the motor vehicle with a driving mechanism and at the same time allow them to be steered in any direction.

Figure 1, is a horizontal sectional view of one of the front wheels of the motor vehicle embodying my invention.

Fig. 2, is a vertical sectional view of the same.

Fig. 3, is a vertical cross-sectional view.

Referring to the drawings in detail 4 indicates a wheel of an ordinary motor truck or the like, the same being provided with a hub 5, by which the wheel is supported on the short axle 6. The axle 6 is supported in the housing 7, which is preferably constructed of two parts so that the several parts can be readily assembled. In this housing is located a worm gear 8; this gear is keyed to the hub 5, and by means of this gear the wheel is placed in rotation on the axle 6.

The axle 6 is held stationary in the housing by means of the pin 9. In the housing is supported a vertical worm 10, which is mounted on the shaft 11, and the shaft has bearing in both parts of the housing.

In the upper and lower portion of the housing concentric with the shaft 11 are formed trunnions 12 and 13 which have bearing in the bifurcated arm 14 of the axle 15, and are introduced by removing the caps 14' bolted to the ends.

Opposite the trunnions 12 and 13 is formed an ear 24 in which is mounted a rod 23. This rod 23 being a portion of the ordinary steering gear of a motor vehicle. The bifurcation on the ends of the axle 15 are of such depth as to allow the rear end 16 of the housing perfect freedom during the steering movement of the wheels.

On top of the axle 15 is provided an extension 17 which acts as a bearing for the shaft 18, the ends of which are provided with a beveled gear 19 which meshes with the beveled gear 20 mounted on the top of the shaft 11.

These beveled gears are covered with a hood 21 which protects the same from dust or other foreign substance. The hood is provided with a covered opening through which grease or oil is inserted to lubricate the beveled gears.

The shaft 18 which drives the worm mechanism is driven in the same manner as the rear drive on motor vehicles now in use. This shaft may be provided with the usual differential gearing so as to allow the faster rotation of one wheel when rounding the corner.

The essential feature of my invention is to equip the steering wheels of a motor vehicle with a worm driving mechanism and at the same time allow them to be turned so that the vehicle may be properly guided without the disturbing of the power exerted on the wheels.

Having fully described my invention what I claim is:

1. A driving mechanism for automobile wheels comprising a housing, a short axle supported therein, a wheel axially mounted upon said short axle, a worm gear attached to the hub of the wheel, a worm meshing with the worm gear, means for imparting rotation to the worm, an axle and means for supporting the housing within the axle, substantially as specified.

2. A driving mechanism for automobiles comprises an auto wheel, a short axle supporting the same, a worm gear connected to the wheel, a worm meshing with the worm gear and a beveled gear mechanism for operating the worm, substantially as specified.

3. A driving mechanism for auto wheels comprising an axle having a bifurcated end, a housing swivelly mounted therein, a worm mechanism located in the housing, in combination with a wheel driven by the worm mechanism, substantially as specified.

4. A driving mechanism for auto wheels comprising an axle having bifurcations forming the end thereof, a housing supported in the bifurcations, a driving shaft supported on the axle, a worm mechanism supported in the housing and rotated by the driving shaft, in combination with a wheel supported by the housing and rotated by the worm mechanism, substantially as specified.

5. A driving mechanism for auto wheels comprising a vehicle wheel, a short axle mounted in the hub thereof; a split housing holding the short axle stationary, a worm wheel keyed on the hub of the wheel, a worm arranged in mesh with the worm gear and axially mounted in the housing, and a bevel gear mechanism for operating the worm, in combination with a vehicle axle having bifurcations between which the housing is mounted, substantially as specified.

In testimony whereof, I have signed my name to this specification, in presence of two subscribing witnesses.

JOHN R. JOHNSON.

Witnesses:
 ALBERT R. OLSON,
 O. E. GUNDERSON.